(12) United States Patent
Liu et al.

(10) Patent No.: US 8,167,210 B2
(45) Date of Patent: May 1, 2012

(54) SYSTEM FOR INCREASING IMAGING QUALITY

(75) Inventors: Rong Liu, Selden, NY (US); Vladimir Gurevich, Stony Brook, NY (US); Ming Yu, Hoffman Estates, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 492 days.

(21) Appl. No.: 12/211,941

(22) Filed: Sep. 17, 2008

(65) Prior Publication Data

US 2010/0065641 A1    Mar. 18, 2010

(51) Int. Cl.
*G02B 5/00* (2006.01)
(52) U.S. Cl. .............................. 235/462.32; 235/462.43
(58) Field of Classification Search ............. 235/462.32, 235/462.43, 462.22, 462.24
See application file for complete search history.

(56) References Cited

U.S. PATENT DOCUMENTS

| | | | |
|---|---|---|---|
| 6,976,629 B2 * | 12/2005 | Carlson | 235/462.11 |
| 7,147,162 B2 * | 12/2006 | Fitch et al. | 235/472.01 |
| 7,533,824 B2 * | 5/2009 | Hennick et al. | 235/462.45 |
| 7,823,789 B2 * | 11/2010 | Nunnink | 235/472.01 |
| 2008/0156880 A1 | 7/2008 | Vinogradov | |

* cited by examiner

*Primary Examiner* — Ahshik Kim
(74) *Attorney, Agent, or Firm* — Nong-Qiang Fan

(57) ABSTRACT

A method and apparatus for improving the image quality obtained by an imaging-based scanner comprising a housing supporting one or more protective windows. The apparatus further comprises at least one scanning arrangement, the scanning arrangement comprising illumination and imaging optics. The illumination and imaging optics form a respective field of view for imaging a target object. A light baffle is attached to the scanning arrangement. The light baffle has an aperture corresponding to each of the illumination and imaging optics such that stray light reflected from the protective windows is absorbed by the light baffle, improving the image quality of the imaging-based scanner.

22 Claims, 8 Drawing Sheets

SYSTEM FOR INCREASING IMAGING QUALITY

TECHNICAL FIELD

The present disclosure relates to a system comprising a method and apparatus for increasing the imaging quality in an imaging scanner.

BACKGROUND

Imaging-based barcode readers may be portable or stationary. A portable barcode reader is one that is adapted to be held in a user's hand and moved with respect to target indicia, such as a target barcode, to be read, that is, imaged and decoded. Stationary barcode readers are mounted in a fixed position, for example, relative to a point-of-sales counter and often referred to as a bi-optic scanner or bi-optic imager. Target objects, e.g., a product package that includes a target barcode, are moved or swiped past one of the one or more transparent windows and thereby pass within a field-of-view ("FOV") of the stationary barcode readers. The barcode reader typically provides an audible and/or visual signal to indicate the target barcode has been successfully imaged and decoded.

A typical example where a stationary imaging-based barcode reader would be utilized includes a point of sale counter/cash register where customers pay for their purchases. The reader is typically enclosed in a housing that is installed in the counter and normally includes a vertically oriented transparent protection window and/or a horizontally oriented transparent protective window, either of which may be used for reading the target barcode affixed to the target object, i.e., the product or product's packaging for the product having the target barcode imprinted or affixed to it. The sales person (or customer in the case of self-service check out) sequentially presents each target object's barcode either to the vertically oriented window or the horizontally oriented window, whichever is more convenient given the specific size and shape of the target object and the position of the barcode on the target object.

The stationary and portable imaging-based barcode readers typically include at least one camera or scan engine and can include a plurality of scan engines located behind any number of protective windows. Each scan engine may have a different field-of-view from every other scan engine in the imaging-scanner system. While the fields-of-view may overlap to some degree, the effective or total field-of-view ("TFV") of the multi-imaging scanner is increased by adding additional camera systems. Hence, the desirability of multi-camera readers as compared to signal camera readers, which have a smaller effective field-of-view and require presentation of a target barcode to the reader in a very limited orientation to obtain a successful, decodable image, that is, an image of the target barcode that is decodable.

A typical scan engine comprises a plurality imaging pixel arrays or photosensitive elements such as charge coupled device (CCD) arrays and complementary metal oxide semiconductor (CMOS) arrays. The scan engine also typically includes an illumination system comprising light emitting diodes (LEDs) or cold cathode fluorescent lamp (CCFL) that direct illumination toward a target object, e.g., a target bar code. Light reflected from the target bar code is typically focused through a lens located near or on the scan engine within the imaging system such that the focused light is concentrated onto the pixel array or photosensitive elements. Thus, an image from a field-of-view of the focusing lens is focused on the pixel array. Periodically, the pixels of the array are sequentially read out by the scan engine, generating an analog signal representative of a captured image frame. The analog signal is amplified by a gain factor and the amplified analog signal is digitized by an analog-to-digital converter. Decoding circuitry of the imaging system processes the digitized signals and decodes the imaged bar code.

Such imaging systems as described above are usually very sensitive to stray lights from ambient and internal or external illumination. Ghost images and significant reductions in the image contrast undesirably occur as a result of stray light. Stray light is often considered as the least intuitive and most undesirable in any optical designs, and it is also usually very computationally intensive to model even using a modern computer. Moreover, it can be extremely costly to discover the presence of stray light at the end phase of any product design.

SUMMARY

One example embodiment of the present disclosure includes an imaging-based scanner for imaging target objects. The imaging based scanner comprises a housing supporting one or more transparent protective windows. The housing and one or more transparent protective windows define an interior region. At least one scanning arrangement is located within the interior region. The scanning arrangement comprises illumination and imaging optics and the illumination and imaging optics form a respective field of view for imaging a target object. A light baffle is attached to the scanning arrangement. The light baffle has an aperture corresponding to each of the illumination and imaging optics. Stray light reflected from the protective windows is absorbed by the light baffle, improving the image quality of the imaging-based scanner.

Another example embodiment of the present disclosure comprises a method of improving the quality of scanned images in a bi-optic or portable image based scanner that includes locating at least one scanning arrangement inside a housing behind at least one protective window. The housing and protective window define an interior region. The method further comprises positioning a light baffle in the interior region between the scanning arrangement and the at least one protective window. The light baffle covers fixtures and electrical components located on the scanning arrangement. The method further comprises aligning tapered openings in the light baffle with corresponding optical elements located in the scanning arrangement and reducing and absorbing light reflected from the one or more protective windows with the light baffle, thereby improving the quality of the scanned images in a bi-optic or portable image based scanner.

A further example embodiment of the present disclosure comprises a method of improving the quality in of the scanned images in a scanner including the steps of locating at least one scanning means inside a housing behind at least one protective window. The housing and protective window define an interior region. The method further comprises positioning a light diffusion means in the interior region between the scanning means and the at least one protective window. The light diffusing means covers fixtures and electrical components located on the scanning means. The method also comprises aligning tapered openings in the light diffusion means with corresponding optical elements located in the scanning means and reducing and absorbing light reflected from the one or more protective windows with the light diffusion means thereby improving the quality of the scanned images.

Yet another example of the present disclosure comprises an apparatus for improving the quality of imaged objects obtained from a bi-optic or portable image-based scanner. The apparatus comprises a light baffle for covering a face of a scanning arrangement located within the interior of a bi-optic or portable image-based scanner. The light baffle is constructed from black rubber or soft black plastic. The apparatus further comprises a plurality of apertures located in the light baffle corresponding to each optical element located in the scanning arrangement. The plurality of apertures comprises tapered openings being smallest near the face of the scanning arrangement and extending to larger diameters outwardly. The light baffle is positioned between the scanning arrangement and exit window of a portable or bi-optic scanner such that reflected and stray light from the surface of the window is minimized and wherein the tapered openings truncates and/or absorbs light outside the desired field of view of each optical element located in the scanning arrangement.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

The present disclosure relates to a system for increasing the imaging quality in an imaging scanner. In particular, the system of the present disclosure comprises an apparatus and method for increasing the imaging quality of an imaging scanner by reducing the amount of stray light on the imaging sensor or sensors.

Figure 1:
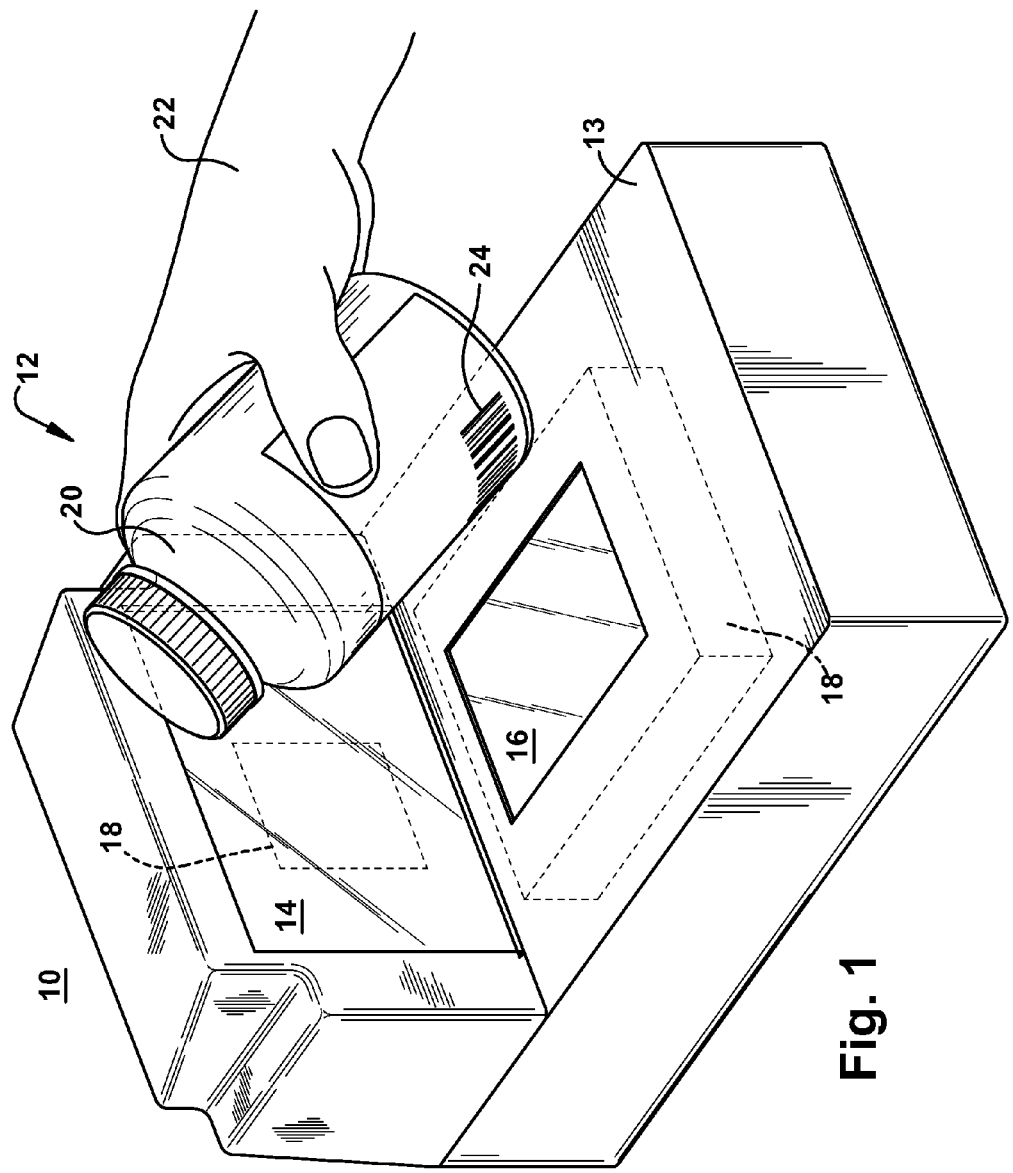
FIG. 1 is a perspective view of a stationary or bi-optic scanner having at least one scan engine internally located for imaging a target object.

With reference now to the figures, and in particular with reference to FIG. 1, there is depicted an imaging system 10 comprising a stationary or bi-optic scanner 12 surrounded by a housing 13. Vertically located in the housing 13 of the bi-optic scanner 12 is a vertical protective window 14. Horizontally located in the housing 13 of the bi-optic scanner 12 is a horizontal protective window 16. Residing behind the horizontal and vertical windows 14, 16, respectively in the housing 13 is one to a plurality of scan engines 18.

In the illustrated operation of the bi-optic scanner 12 of FIG. 1, a product 20 is swiped across the scanner has it is held in the hand 22 of a user or consumer. The product 20 includes a target object 24 that in the illustrated embodiment is a barcode. Each of the scan engines 18 projects a field-of-view during operation such that the image in the target object 24 can be decoded by one or more of the scan engines.

The imaging system 10 of the present disclosure in addition to imaging and decoding 1D and 2D bar codes, including for example postal codes, and Code 39 bar codes is also capable of capturing images and signatures. It should be recognized that the imaging system 10 of the present disclosure, to be further explained below, may be advantageously used in connection with any type of imaging-based automatic identification system including, but not limited to, bar code scanners, signature imaging acquisition and identification systems, optical character recognition systems, fingerprint identification systems, and the like. It is the intent of the present disclosure to encompass all such imaging-based automatic identification systems.

Figure 2:
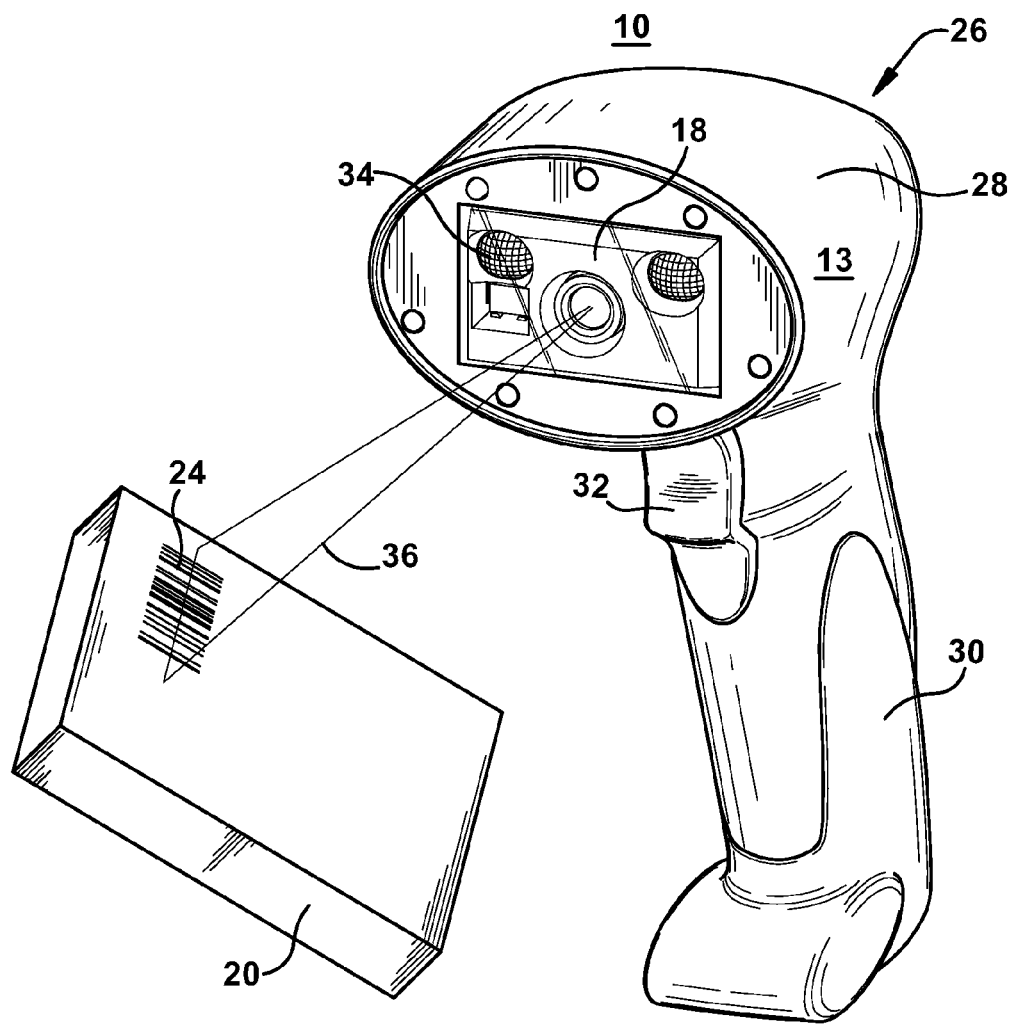
FIG. 2 is a perspective view of a portable scanner having at least one scan engine internally located for imaging a target object.

In one example embodiment illustrated in FIG. 2, the imaging system 10 comprises a hand held portable scanner 26 that can be carried and used by a user walking or riding through a store, warehouse, or plant, while reading various symbology codes for stocking and inventory control purposes. The portable scanner 26 of FIG. 2 includes a housing 13 having a head 28, handle 30, and trigger 32. Located in the housing is a protective window 34 for protecting one to a plurality of scan engines 18.

Each of the scan engines 18 project a field-of-view 36 toward the target object 24 located on the product 20 or product's packaging during operation for decoding the image found in the target object. The operation of the decoding process by the scan engine 18 is further described in detail in U.S. application Ser. No. 11/647,877 having a filing date of Dec. 29, 2006 entitled IMAGING-BASED READER HAVING LIGHT GUIDED ILLUMINATION, which is assigned to the assignee of the present application and incorporated herein by reference.

Figure 3:
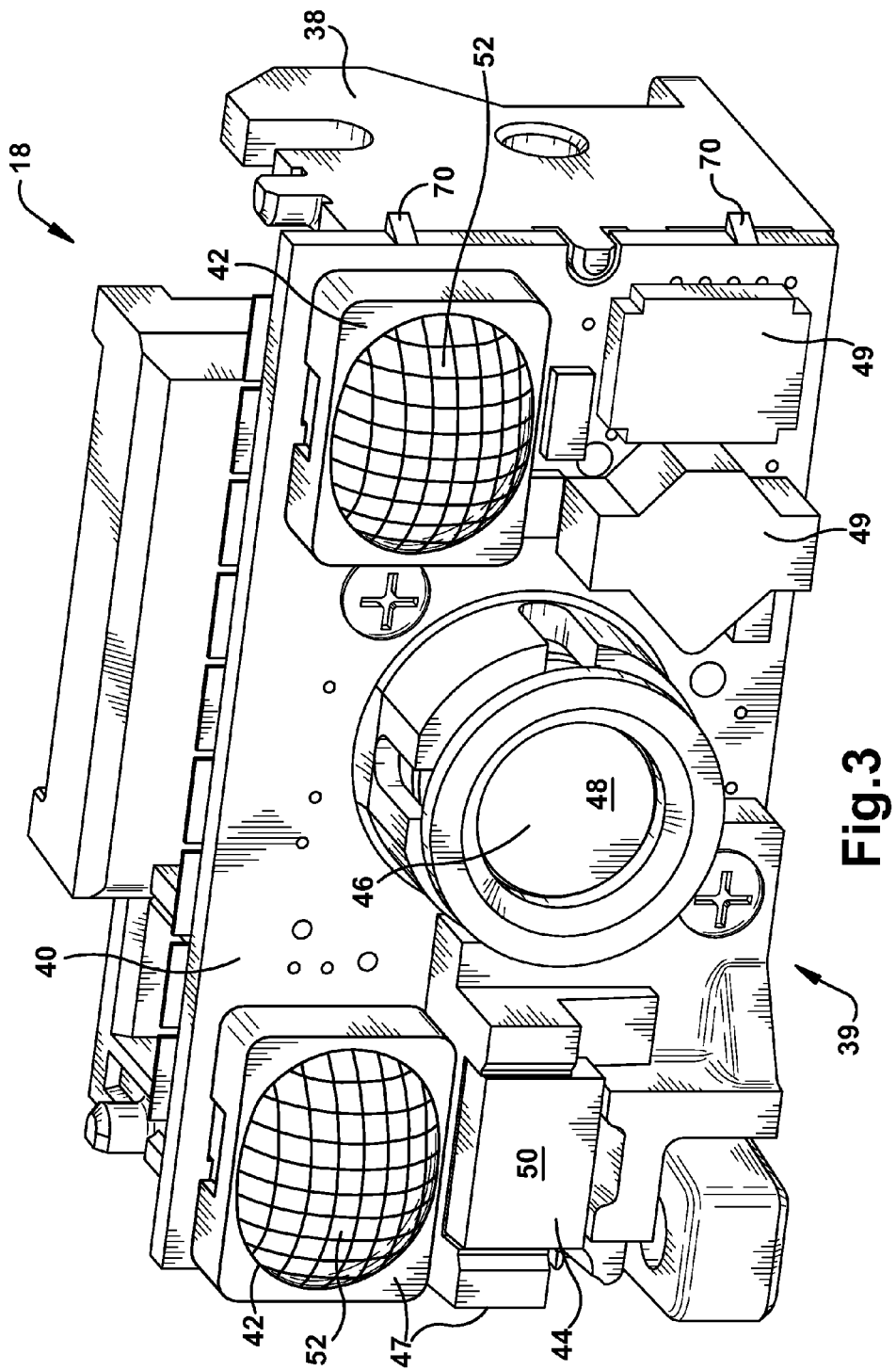
FIG. 3 is a perspective view of a single scan engine used by portable and bi-optic scanners.

Illustrated in FIG. 3 is perspective view of a single scan engine 18. The scan engine 18 comprises a chassis 38 and a front face 39. Connected to the chassis 38 along the front face 39 is a printed circuit board 40. Attached to the printed circuit board 40 are several optical components that include, illumination optics 42, aiming optics 44, and imaging optics 46. Each of the optical components have a designed field-of-view for projecting or receiving light directed during operation at the target object 24. The optical components above are further secured to the printed circuit board 40 by surface objects 47. Also coupled to the printed circuit board 40 are various electrical components 49 that assist the scan engine 18 in imaging and decoding the target object 24.

The imaging optics 46 includes focusing lens or lenses 48 that focus the reflected image from the target object 24 onto a sensor array (not shown) located behind the focusing lens(es) and in front of the printed circuit board 40. The aiming optics 44 include a refractive or diffractive optical element 50 that facilitates in the projection of an aiming pattern (not shown) for aligning the scan engine with the target object 24. The aiming pattern is generated by a laser diode (not shown) located behind the optical element 50 and coupled to the printed circuit board 40.

The illumination optics 42 comprise illumination lenses 52 that facilitate the direction of illumination from a LED or bank of LEDs (not shown) located behind the lenses and coupled to the printed circuit board 40. The illumination optics 42 direct light toward the target object 24 such that light is reflected off the target object and received by the focusing lens 48 and projected onto the scan engine's 18 sensor array for decoding.

Because the scan engine 18 is populated with many fixtures 47 for securing the optical elements along the front face 39 of the printed circuit board 40 and electrical components 49 (see FIG. 3) multiple reflective and scatter characteristics result. If an uncoated protective window is used to seal and protect the scan engine 18 within the housing 13 of the imaging system 10, then Fresnel reflections and stray light from the surfaces of the clear window undesirably become a source of illumination. The consequence is that any reflective part on the front surface of the scan engine 18 now becomes a potential source stray light. As a result, the image captured by the scan engine 18 is produced with poor quality degradation.

Figure 4:
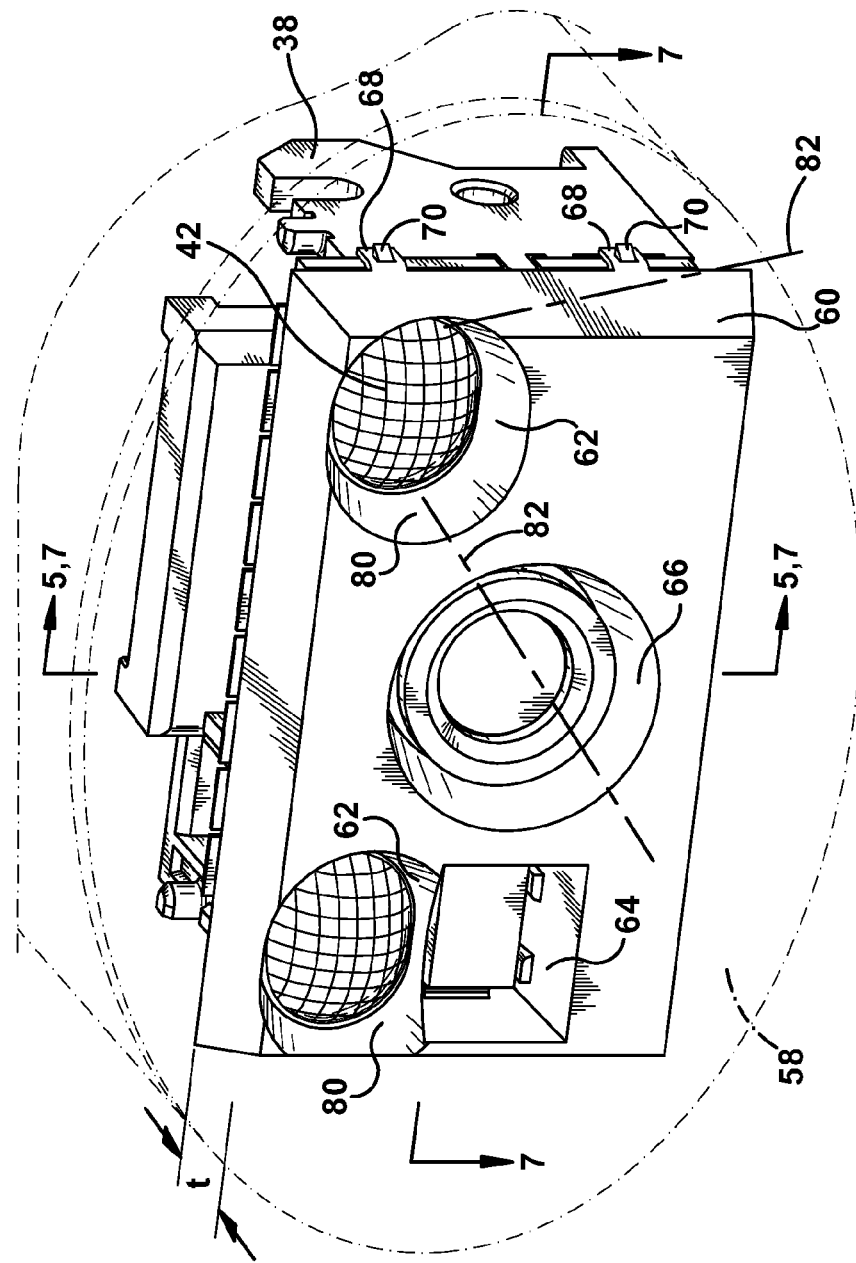
FIG. 4 is a perspective view of a scan engine comprising a light baffle constructed in accordance with one exemplary embodiment of the present disclosure.

Referring now to FIG. 4 is a perspective view of a scan engine 18 located in a housing 13 behind a protective window 58 of a bi-optic scanner 12 or portable imager 26. The scan engine in FIG. 4 comprises a light baffle 60 constructed in accordance with one exemplary embodiment of the present disclosure. The light baffle 60 reduces the undesired stray light on the sensor of the scan engine 18. In one embodiment, the light baffle 60 is matte black shaped an cut straight without a taper so that it only provides clearance for optical surfaces of the optical elements 42, 44, and 46 as illustrated in FIG. 4. The light baffle 60 is generally formed form soft plastic, matte black absorptive non-reflective material, or rubber and includes a thickness ranging between two (2) to twenty-five (25) millimeters represented by dimension "t", or could be thicker or thinner depending on the application.

The light baffle 60 is in contact with the surface of the scan engine 18 and covers in one embodiment all objects on the front face 39 of the scan engine except for the surfaces of the optical elements 42, 44, and 46, reducing the reflection of light off the fixtures 47, printed circuit board 40, electrical components 49, and the like. As a result, all reflections off the protective window are absorbed by the light baffle 60, improving the image quality and reducing stray light. Tapered openings 62 (illumination openings), 64 (aiming opening), and 66 (imaging opening) are formed in the light baffle 60 for illumination optics 42, aiming optics 44, and imaging optics 46, respectively.

In one example embodiment, the light baffle 60 is attached to the chassis 38 of the scan engine by fasteners. In another example embodiment, the light baffle 60 is attached to the chassis 38 by adhesives. In yet another embodiment, the light baffle 60 includes clips 68 that lock over bosses 70 located on the chassis 38.

Figure 5:
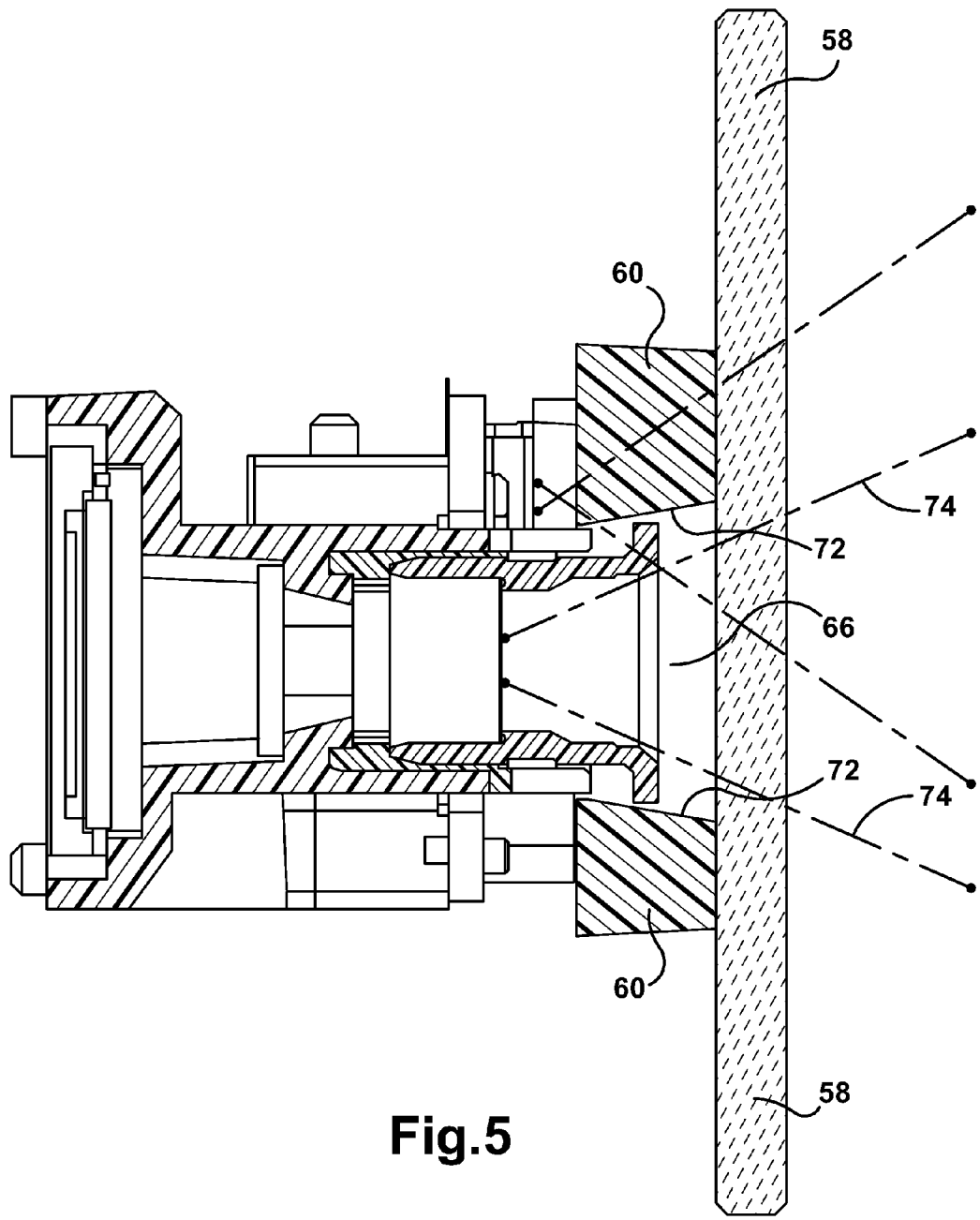
FIG. 5 is a cross-sectional side view of the scan engine of FIG. 4 having a light baffle constructed in accordance with another exemplary embodiment of the present disclosure.

Illustrated in FIG. 5 is a cross-sectional side view of the scan engine 18 of FIG. 4 having a light baffle 60 constructed in accordance with another exemplary embodiment of the present disclosure. The light baffle 60 in the exemplary embodiment of FIG. 5 is in contact with protective window 58, providing the advantage of shock absorption in cases of impact or shock to the imaging system.

FIG. 5 further illustrates an example embodiment in which the imaging opening 66 includes a tapered-shaped portion 72 that coincides with focusing lens 48 of the imaging optic's 46 field-of-view represented by lines 74. The light baffle 60 through the contour of the tapered-shaped opening portion 72 absorbs and/or truncates reflected light outside the desired field-of-view 74.

An additional benefit of the light baffle 60 is that it is also designed to constrain and shape the illumination pattern. Illumination sources such as LEDs behind the illumination optics 42 provide lambertian intensity distribution. When coupled with the illumination lens 52, the light distribution is shaped so that a majority of the energy falls within certain field of view envelope. However, there is always some loss due to coupling and internal reflections inside the lens that cause light to scatter outside the desired FOV envelope. In situations where there is wide anamorphic illumination FOV, a majority of the higher angle rays are emitted from and near the perimeter of the lens. Thus, the light baffle 60 will effectively constraints the higher angle ray bundles and provide visibly sharp illumination. This is seen with respect to the discussion relating to FIGS. 4-7.

Figure 6:
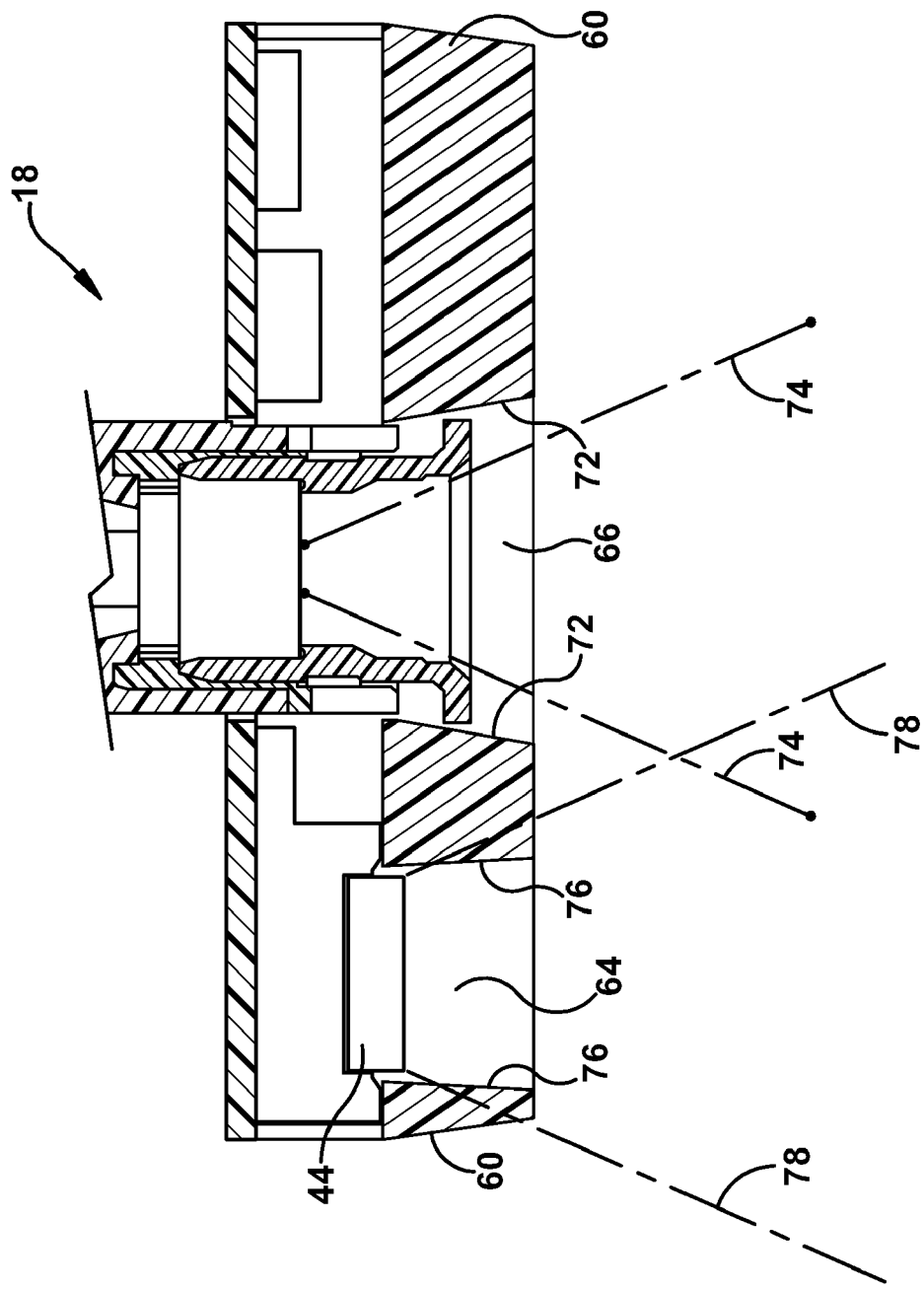
FIG. 6 is a cross-sectional plan view of the scan engine of FIG. 4 having a light baffle constructed in accordance with another exemplary embodiment of the present disclosure.

FIG. 6 is a sectional plan view of the scan engine of FIG. 4, similarly illustrating an example embodiment in which the aiming opening 64 includes a tapered portion 76 that coincides with aiming optics 44 field of view represented by lines 78. The light baffle 60 through the contour of the tapered opening portion 76 absorbs or truncates reflected light outside the desired field-of-view 78.

Similarly in one example embodiment, the illumination opening 62 includes a tapered portion 80 (see FIG. 4) that coincides with illumination optics 42 field of view represented by lines 82. The light baffle 60 through the contour of the tapered opening portion 80 absorbs or truncates reflected light outside the desired field of view 82.

Figure 7:
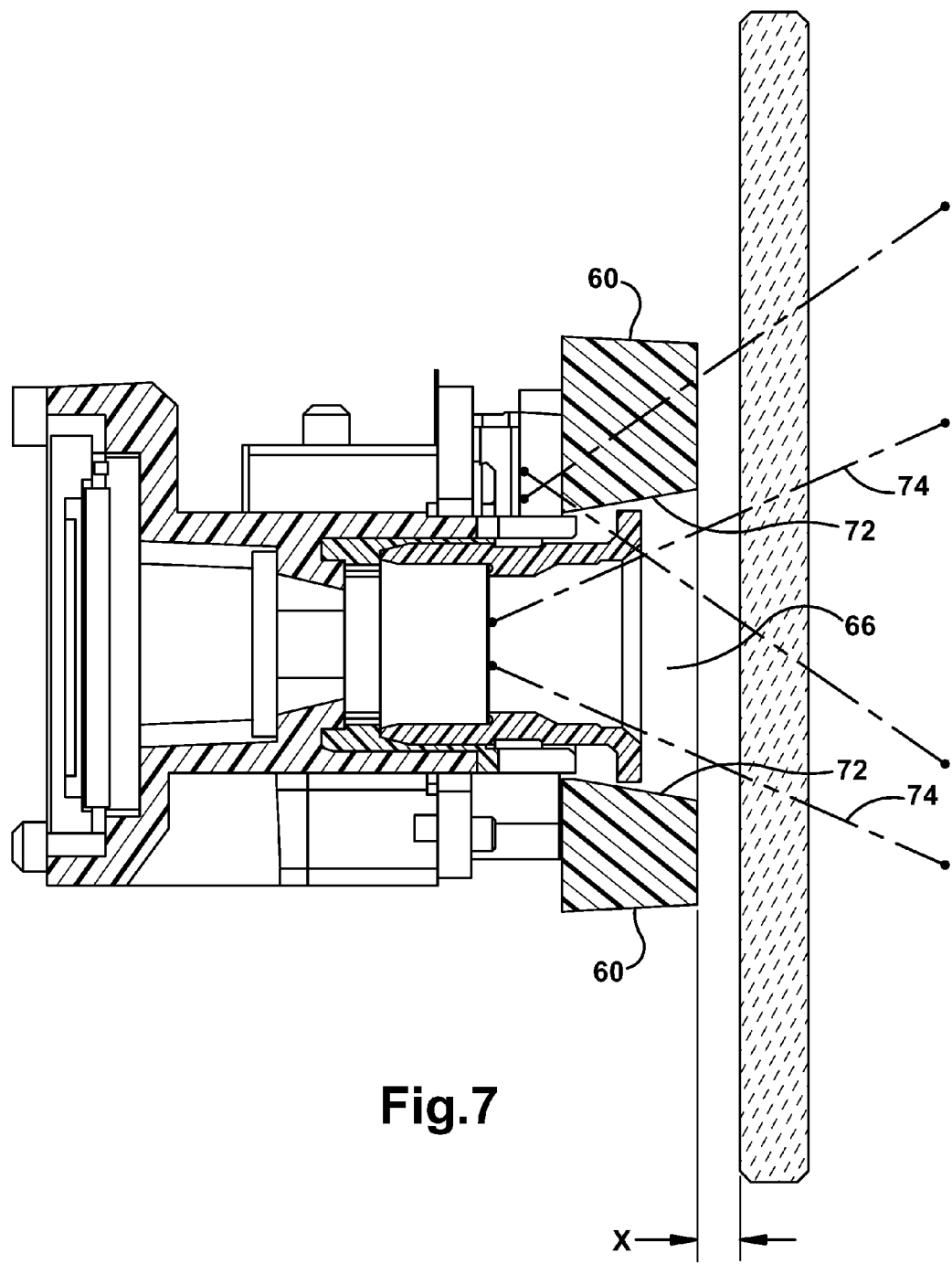
FIG. 7 is a cross-sectional side view of the scan engine of FIG. 4 having a light baffle constructed in accordance with another exemplary embodiment of the present disclosure.

FIG. 7 is a cross-sectional side view of the scan engine 18 of FIG. 4 having a light baffle 60 constructed in accordance with another exemplary embodiment of the present disclosure. In the example embodiment of FIG. 7, the light baffle 60 is positioned at a distance "X" away from the protective window 58. In one exemplary embodiment, the distance X is approximately one (1) millimeter. This distance allows for some deflection during shock or impact to the protective window 58 before using the light baffle 60 as and energy buffer, protecting the electronics in the scan engine 18 as a result.

Figure 8:
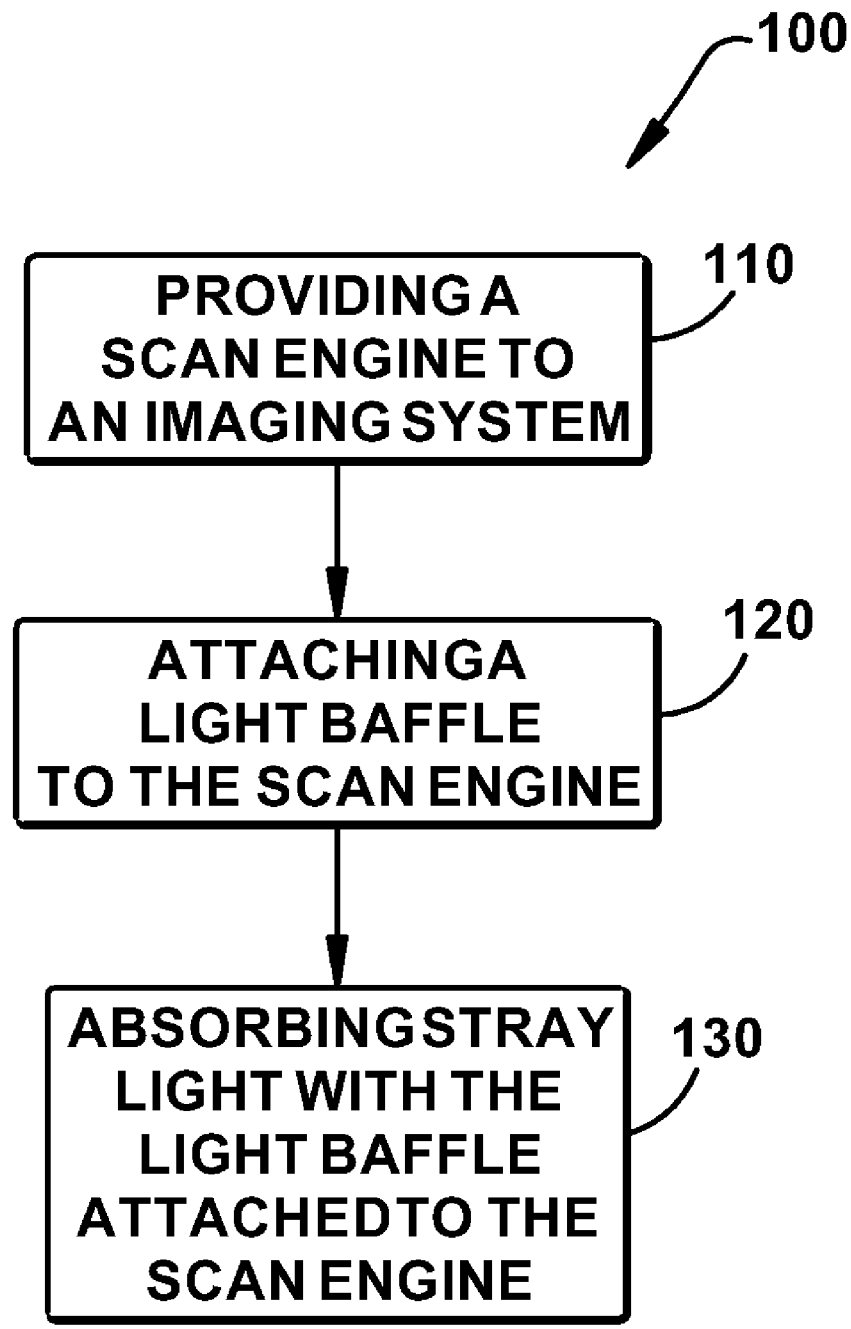
FIG. 8 is a flowchart of an exemplary embodiment of the disclosure.

FIG. 8 illustrates a process 100 for reducing stray light and improving imaging quality in an imaging system. At 110, the process comprises providing a scan engine to an imaging system. At 120, the process comprises, attaching a light baffle to the scan engine. At 130, the process comprises, absorbing stray light with the light baffle attached to the scan engine.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An imaging-based scanner for imaging target objects, the imaging based scanner comprising:

a housing supporting one or more transparent protective windows, the housing and one or more transparent protective windows defining an interior region;

a least one scanning arrangement located within said interior region, the scanning arrangement comprising illumination and imaging optics, the illumination and imaging optics forming a respective field of view for imaging a target object;

a light baffle being opaque to light is attached to said scanning arrangement, the light baffle having an aperture corresponding to each of said illumination and imaging optics, wherein stray light reflected from said protective windows is absorbed by said light baffle, improving the image quality of the imaging-based scanner.

2. The imaging-based scanner of claim 1 wherein said light baffle is matte black and said apertures are tapered apertures.

3. The imaging-based scanner of claim 1 wherein said light baffle is constructed of soft plastic.

4. The imaging-based scanner of claim 1 wherein said light baffle is constructed of rubber.

5. The imaging-based scanner of claim 1 wherein said scanning arrangement further comprises a chassis having bosses for attaching said light baffle to corresponding clasps formed in said light baffle.

6. The imaging-based scanner of claim 1 wherein said light baffle is in contact with said protective window.

7. The imaging-based scanner of claim 1 wherein said light baffle protects said scanning arrangement from impact or shock.

8. The imaging-based scanner of claim 1 wherein said light baffle is spaced from said protective window or windows.

9. The imaging-based scanner of claim 1 wherein said scanning arrangement further comprises aiming optics forming a respective field of view for imaging a target object, said light baffle further comprising an aperture corresponding to said aiming optics.

10. The imaging-based scanner of claim 9 wherein said illumination, aiming, and imaging optics are located on a common surface of the scanning arrangement and said light baffle is attached to said common surface of the scanning arrangement.

11. The imaging-based scanner of claim 10 wherein said tapered apertures are tapered-shaped apertures corresponding to each of said illumination, aiming, and imaging optics that truncates and/or absorbs light outside the field of view of each of said illumination, aiming, and imaging optics.

12. A method of improving the quality of the scanned images in a bi-optic or portable image based scanner, the method comprising the steps of:
  locating at least one scanning arrangement inside a housing behind at least one protective window, the housing and protective window defining an interior region;
  positioning a light baffle in the interior region between said scanning arrangement and said at least one protective window, the light baffle covering fixtures and electrical components located on the scanning arrangement;
  aligning tapered openings in said light baffle with corresponding optical elements located in said scanning arrangement; and
  reducing and absorbing light reflected from said one or more protective windows with said light baffle thereby improving the quality of the scanned images in a bi-optic or portable image based scanner.

13. The method of claim 12 further comprising the step aligning the tapered opening in the light baffle with the corresponding optical elements located in the scanning arrangement such that the tapered portion of the tapered openings coincide with the optical elements fields-of-view such that the contour of the tapered openings absorbs and/or truncates reflected light outside of the respective field-of-view.

14. The method of claim 13 wherein said optical elements comprise illumination, aiming, and imaging optics.

15. The method of claim 14 further comprising attaching said light baffle to said scanning arrangement by one of fasteners, adhesives, and clips.

16. A method of improving the quality in of the scanned images in a scanner, the method comprising the steps of:
  locating at least one scanning means inside a housing behind at least one protective window, the housing and protective window defining an interior region;
  positioning a light diffusion means in the interior region between said scanning means and said at least one protective window, the light diffusing means covering fixtures and electrical components located on the scanning means;
  aligning tapered openings in said light diffusion means with corresponding optical elements located in said scanning means; and
  reducing and absorbing light reflected from said one or more protective windows with said light diffusion means thereby improving the quality of the scanned images.

17. An apparatus for improving the quality of imaged objects obtained from a bi-optic or portable image-based scanner, the apparatus comprising:
  a light baffle for covering a face of a scanning arrangement located within the interior of a bi-optic or portable image-based scanner, the light baffle is constructed from black rubber or soft black plastic;
  a plurality of apertures located in the light baffle corresponding to each optical element located in the scanning arrangement, the plurality of apertures comprising a tapered openings having a smallest diameter near the face of the scanning arrangement and extending to larger diameters outwardly, the light baffle to be positioned between the scanning arrangement and exit window of a portable or bi-optic scanner such that reflected and stray light from the surface of the window is minimized and wherein said tapered openings truncates and/or absorbs light outside the desired field of view of each optical element located in the scanning arrangement.

18. The apparatus of claim 17 wherein said light baffle is attached to the scanning arrangement by one of adhesives, fasteners, and clips.

19. The apparatus of claim 17 wherein said light baffle and protective window are in contact to provide protection to the scanning arrangement from impacts or shock.

20. The apparatus of claim 17, wherein each optical element located in the scanning arrangement comprises at least one illumination source.

21. The apparatus of claim 17, wherein each optical element located in the scanning arrangement comprises at least one aiming source.

22. The apparatus of claim 17, wherein each optical element located in the scanning arrangement comprises at least one imaging source.

* * * * *